Patented Mar. 4, 1930

1,749,153

UNITED STATES PATENT OFFICE

THOMAS O'CONNOR, OF MINNEAPOLIS, MINNESOTA; MERCHANTS TRUST COMPANY EXECUTOR OF SAID THOMAS O'CONNOR, DECEASED

SELF-PRESERVING MILK PRODUCT

No Drawing. Application filed February 8, 1926. Serial No. 86,927.

This invention relates to a milk product, particularly, although not exclusively, adapted for use in making bread, cake and other farinaceous food products on a commercial scale.

Heretofore, many large bakeries have had difficulty in obtaining milk which is suitable for use in making milk bread in sufficient quantities, without resorting to an expensive, desiccated product. Such dry, powdered milk products are difficult to handle in a bakery, because they must be rehydrated before a sufficiently thorough mixture, with the other ingredients, can be obtained, and due to their hygroscopic nature, such products quickly deteriorate after the containers have been opened.

It has been attempted to overcome the defects of a dry milk product by the use of sweetened condensed milk, which is supplied in a fluid or semi-fluid condition. However, it has been discovered that to preserve such a product by the use of sugar or sucrose, it is necessary to incorporate a quantity thereof, sufficient to make the ratio of sucrose to sucrose and water about 64 per cent. If the product conforms to the United States Government standard, requiring that sweetened condensed milk shall contain at least 28 per cent of milk solids, and is at the same time self preserving, it will be readily seen that the maximum of water which can be incorporated is about 26.28 per cent, in a product containing 45.72 per cent of sucrose. It is thus evident that where the milk product is to be shipped to distant points and preserved for long periods of time, only a small per cent of water can be incorporated therein, and such a product has been found to be so viscous that it is difficult to handle.

Another disadvantage attendant upon the use of a milk product having a sugar content as high as 45 parts of sucrose to 28 parts of milk solids lies in the fact that insufficient milk solids can be added to the bread dough. This result necessarily follows if the Government standard for milk bread is to be complied with. Thus, it has been held by governmental authority that the term "milk bread" may be applied only to a bread obtained by baking wheat bread dough, in which not less than one-third of the water ingredient has been replaced by milk, or by the constituents of milk solids in proportions normal for whole milk. As about 66 pounds of water are commonly used for each 100 pounds of flour in bread dough, and skimmed milk normally contains about 9 per cent of milk solids, it will be evident that a milk bread should contain not less than about two pounds of milk solids for each hundred pounds of flour. Sucrose, in excess of about two and one-half pounds for each one hundred pounds of flour is not desirable in most kinds of bread. If as much as 2 pounds of milk solids are to be incorporated in the dough, the use of sweetened, condensed milk having milk solids and sucrose in the proportions of 28 parts of milk solids to 45.72 parts of sucrose would require the addition of about 3.26 pounds of sucrose per 100 pounds of flour, or an amount which is excessive for most dough mixtures.

A still further disadvantage of a milk product which is high in sugar content, relative to milk solids, lies in the expense attendant upon shipping the sugar with the milk. Whether or not the milk contains a preservative amount of sugar, large quantities of sugar are necessarily kept on hand at all bakeries, so that the expense of shipping the excess sugar in such milk products, increases the cost of the product.

To avoid the many disadvantages above pointed out, it has been common practice in bakeries to purchase fresh milk, where available, or otherwise to obtain a sweetened product which is not self preserving for a long period of time, and to depend upon use of the milk before excessive development of acid and destructive organisms therein. This necessitates the use of expensive refrigerators where large quantities of milk are needed.

It is my object to provide an inexpensive milk product, adapted to generally improve the composition and uniformity of texture in a milk bread dough.

Another object is to facilitate the use of such a milk product in widely differing bakers' formulas by providing milk solids therein in preservative combination with saccharine and saline ingredients and in such form and proportions as to be readily miscible in bread doughs.

A further object of my invention is to provide a milk product, which is self preserving, and at the same time contains sufficient water to render it easy to handle and readily miscible with further quantities of water and with the other ingredients of dough.

More particularly, it is my object to make it possible to readily incorporate in the dough an unusually large proportion of milk or milk solids, and at the same time to render the product self preserving by incorporating therein critical quantities of sodium chloride and a suitable sugar, such as corn sugar or dextrose. Other objects of my invention will be more clearly pointed out in the following specification and claims.

To prepare one hundred pounds of my finished product, I take about 340 pounds of raw milk, containing about nine per cent of milk solids, and pasteurize the milk in the usual manner. Skim milk or milk from which the greater part of the butter fat has been removed, is preferable for use in the manufacture of my product, because of its cheapness and freedom from variable quantities of fats, which would affect the quantity of shortening required in different batches of dough. It is also preferable in this process to utilize milk which has an acid content of about .18 per cent or not more than about .25 per cent. To the pasteurized milk is now added nine pounds of common salt or sodium chloride and twenty pounds of corn sugar or "cerolose" which contains approximately 87 per cent of dextrose. It will be evident that sucrose could be substituted for the corn sugar, but for the reasons hereinafter stated, corn sugar containing dextrose is preferred.

In the next step of the process, the solution of salt and sugar in the milk is heated to a temperature of from 160 to 180 degrees Fahrenheit and agitated for a suitable period of time so that all of the salt and sugar is readily placed in solution and thoroughly mixed with the emulsified milk solids.

The mixture of salt, sugar and milk is now pumped into a suitable vacuum tank, adapted to be heated, and approximately 269 pounds of the water content of the milk is evaporated and drawn off. A vacuum of approximately 26 inches of mercury and a temperature of about 130 degrees Fahrenheit is preferred in this step of the process. The finished product is now withdrawn from the vacuum tank and placed in suitable containers for shipping and storage.

The finished product contains approximately 30 per cent of milk solids, 20 per cent of sugar, nine per cent of salt and about 41 per cent of water. Notwithstanding the low sugar ratio or proportion of sugar to sugar and water, which is only about 33 per cent, the product is self preserving and may be stored at normal room temperatures for long periods of time without formation of excessive amounts of acid or destructive organisms. It is further to be noted that the quantity of salt present in the product is small enough to permit addition of an unusually large proportion of milk solids to a bread dough without excess salt. Furthermore, the quantities of sugar and salt are small enough to permit the addition of sugar and salt, when necessary to properly regulate these ingredients in the different batches of dough.

I have found that an excellent milk bread can be produced by baking a dough batch containing 16.8 pounds of my improved product for each one hundred pounds of flour (containing about twelve per cent of moisture) together with the following ingredients in approximately the proportions stated:

| | Pounds |
|---|---|
| Sugar | .00 |
| Salt | .05 |
| Water | 63.13 |
| Shortening | 2.34 |
| Malt extract | 1.049 |
| Yeast food | .61 |
| Yeast | 1.049 |

Unusually good quality and uniformity of texture of the bread produced by the use of my milk product is secured, by reason of the thorough mixture of the salt, sugar and milk in a solution containing water in excess of twenty-five per cent. Thus, the work and expenditure of time required in dissolving the sugar and salt in water, preparatory to incorporating said ingredients in a dough batch is obviated. The dextrose or corn sugar content of my product effects a further saving, both in the cost of the product and in the time required to ferment the dough. It is well known that sucrose ($C_{12}H_{22}O_{11}$) which is commonly used as a preservative in milk products, is not directly acted upon by the yeast; but before the formation of alcohol and carbon dioxide in the dough batch, the sucrose must be changed dextrose ($C_6H_{12}O_6$). Obviously, by avoiding the step of converting sucrose to dextrose, the time required for fermenting the dough batch is reduced.

As will now be readily understood, my product may be manufactured on a large scale in districts where milk is plentiful and then shipped to distant bakeries where it may be stored until needed.

While it is preferable, as above pointed out, to supply the milk product in a liquid or semi-liquid condition, containing between twenty-five and fifty per cent of moisture, it will be evident that for shipment to very distant points or to tropical climates, a substantially dry product might be preferred. Further, a dry product in which the milk solids are thoroughly impregnated with the stated quantities of salt or salt and sugar would possess some of the advantages above pointed out. Therefore, I do not wish to limit the present invention to a liquid or semi-liquid product.

Having described my invention what I claim as new and desire to protect by Letters Patent is:

1. A self preserving, condensed milk product containing not less than twenty-five per cent of water, between seven and fourteen per cent of sodium chloride and at least twenty-eight per cent of milk solids, together with a quantity of sugar.

2. A condensed and self preserving, fluid milk product containing not less than seven per cent of sodium chloride and at least twenty-eight per cent of milk solids.

3. A condensed and self preserving milk product containing milk solids thoroughly mixed and impregnated with about nine per cent by weight of sodium chloride.

4. A condensed and self preserving milk product containing milk solids and sodium chloride in about the proportions of three parts of milk solids to one part of sodium chloride.

5. A self preserving condensed milk product, containing an aqueous solution of dextrose and about nine per cent of sodium chloride.

6. A condensed milk product containing sodium chloride and about twenty per cent of dextrose in an aqueous solution adapted to render the product self preserving.

7. A condensed milk product containing milk solids, sugar, sodium chloride and water in approximately the proportions of thirty per cent milk solids, twenty per cent sugar, nine per cent sodium chloride and forty-one per cent water.

8. A milk product containing between seven and fourteen per cent of sodium chloride and between twenty and thirty per cent of sugar.

9. A condensed milk product of keeping qualities satisfactory for commercial use, consisting of milk solids, salt and water, with or without sugar other than lactose, and in which the weight of the salt is 2 per cent or more of the weight of the water present.

10. A condensed milk product of keeping qualities satisfactory for commercial use consisting of milk solids, salt and water, with or without sugar other than lactose, and in which the weight of the salt is not less than 2 per cent and not more than 40 per cent of the weight of the water present.

In testimony whereof, I have hereunto signed my name to this specification.

THOMAS O'CONNOR.